US008797839B2

(12) United States Patent
Matsumoto (10) Patent No.: US 8,797,839 B2
(45) Date of Patent: Aug. 5, 2014

(54) SIGNALING PROCESSOR AND LINK SWITCHING METHOD

(75) Inventor: Kouichi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 13/144,482

(22) PCT Filed: Jan. 20, 2010

(86) PCT No.: PCT/JP2010/051003
§ 371 (c)(1),
(2), (4) Date: Jul. 13, 2011

(87) PCT Pub. No.: WO2010/084992
PCT Pub. Date: Jul. 29, 2010

(65) Prior Publication Data
US 2011/0280122 A1     Nov. 17, 2011

(30) Foreign Application Priority Data
Jan. 21, 2009   (JP) ................... 2009-011266

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 29/08 | (2006.01) |
| H04L 29/14 | (2006.01) |
| H04L 12/24 | (2006.01) |

(52) U.S. Cl.
CPC .......... *H04L 29/08* (2013.01); *H04L 29/08027* (2013.01); *H04L 29/08036* (2013.01); *H04L 69/40* (2013.01); *H04L 41/0659* (2013.01)

USPC .......................................................... 370/216

(58) Field of Classification Search
None
See application file for complete search history.

(56) References Cited

U.S. PATENT DOCUMENTS

| 6,237,111 B1 | 5/2001 | Gambino | |
| 2002/0178397 A1 * | 11/2002 | Ueno et al. .................... | 714/4 |
| 2007/0165533 A1 * | 7/2007 | Wu .............................. | 370/242 |

FOREIGN PATENT DOCUMENTS

| CN | 1505409 A | 6/2004 |
| JP | 6-120985 A | 4/1994 |

(Continued)

OTHER PUBLICATIONS

Chinese Office Action for CN Application No. 201080004393.3 dated on Jun. 4, 2013 with Partial English Translation.

(Continued)

*Primary Examiner* — John Blanton
*Assistant Examiner* — Christopher Crutchfield
(74) *Attorney, Agent, or Firm* — Sughrue Mion, PLLC (57) ABSTRACT

A signaling processor has a message transfer part for a Layer 2 operable to notify a message transfer part for a Layer 3 of a signal indicative of stop (release) completion of a link being connected when it receives a response to a request for a link release process after detection of a failure of the link being connected and notification of the request for the link release process to a correspondent signaling processor and a message transfer part for the Layer 3 operable to perform a retrieval process of a received signal that has not been retrieved and has been stored in the message transfer part for the Layer 2 when it receives the signal indicative of stop (release) completion of the link.

15 Claims, 4 Drawing Sheets

(56) References Cited

FOREIGN PATENT DOCUMENTS

| JP | 8-181773 A | 7/1996 |
|----|------------|--------|
| JP | 2002354038 A | 12/2002 |
| JP | 2003124995 A | 4/2003 |
| JP | 2003174661 A | 6/2003 |
| JP | 2004112419 A | 4/2004 |
| JP | 2010050770 A | 3/2010 |
| WO | 9856205 A | 12/1998 |

OTHER PUBLICATIONS

International Search Report for PCT/JP2010/051003 mailed May 11, 2010.
TTC JT-Q2110, B-ISDN ATM Adaptation Layer Service Specific Connection Oriented Protocol (SSCOP), 1996.
TTC JT-Q2140, B-ISDN ATM Adaptation Layer-Service Specific Coordination Function for Support of Signaling at the Network-to-Node Interface (SSCF-NNI), 1995.
ITU-T Q.2110, Broadband ISDN, B-ISDN ATM Adaptation Layer—Service Specific Connection Oriented Protocol (SSCOP), Jul. 1994.
ITU-T Q.2140, B-ISDN ATM Adaptation Layer—Service Specific Coordination Function for Signalling at the Network Node Interface (SSCF AT NNI), Feb. 1995.
Collection of Technical Conditions 3.1, MTP Specification (ATM interface for signals), NTT, Internet, <www.ntt-east.co.jp/info-st/constip/cons1/pdf/gijutsu/betsu3-1.pdf>.
S. Kuribayashi, "Easy ATM Network Signal Scheme", the Telecommunications Association, Ohmsha, Sep. 2001, pp. 38-57.

* cited by examiner

SIGNALING PROCESSOR AND LINK SWITCHING METHOD

TECHNICAL FIELD

The present invention relates to a signaling processor for communicating with a correspondent device, and more particularly to a link switching method between nodes of signaling processors.

BACKGROUND ART

For example, a signaling processor connecting to an ATM (Asynchronous Transfer Mode) network has a link failure detection means. If the signaling processor detects a failure that may affect transmission and reception of signaling signals in a link to a correspondent node that has been established through the ATM network, then it switches to another link in which no failure has occurred so as to maintain communication of the signaling signals.

A relevant link switching method of a signaling processor will be described with reference to FIG. 4.

Figure 4:
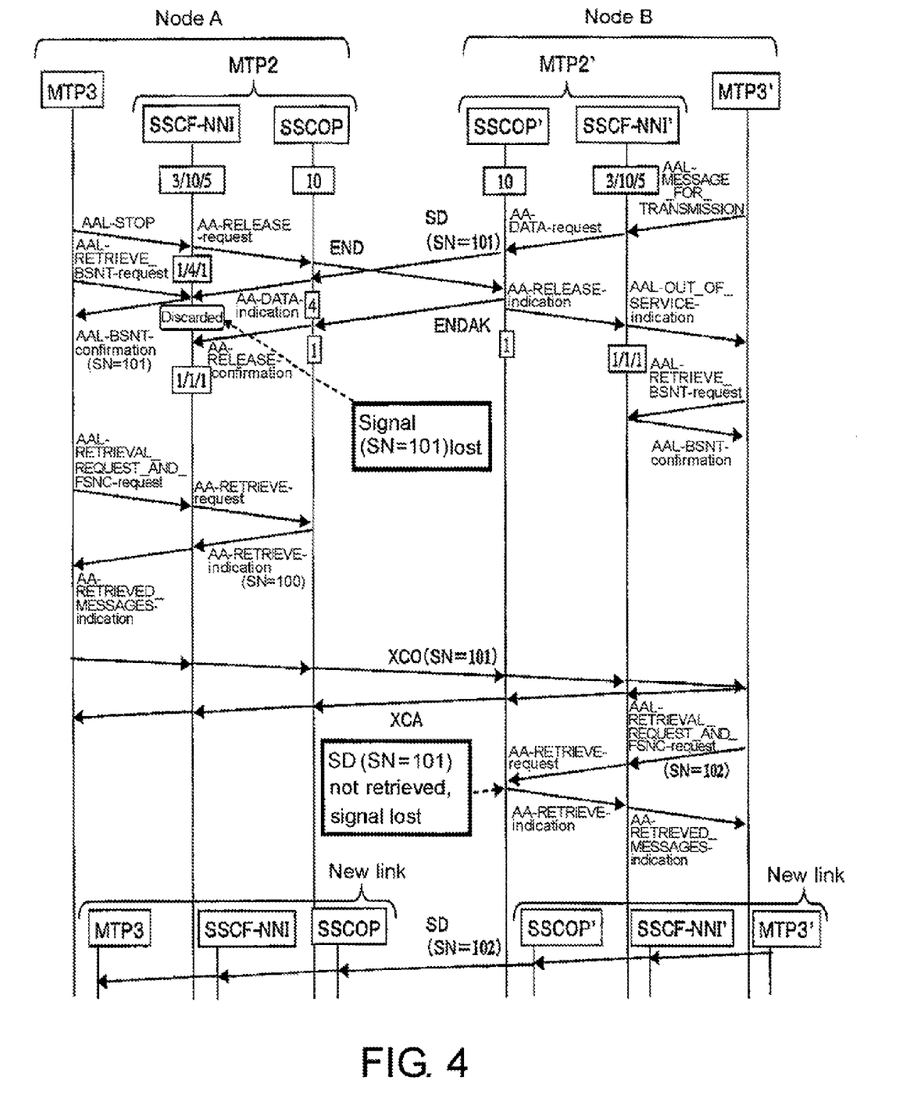
FIG. 4 is a sequence diagram showing an example of a link switching operation between signaling processors connecting to an ATM network according to Recommendation.

Referring to FIG. 4, in a state in which signals (Sequenced Data, or SD) are transmitted and received in a link connected between a node A and a node B, if the node A detects a link failure, an MTP3 of the node A transmits an AAL-STOP signal in order to conduct link switching. When an SSCF-NNI receives the AAL-STOP signal from the MTP3, it transmits an AA-RELEASE-request to an SSCOP and changes to the state 1/4/1 (Out Of Service/Outgoing Disconnection Pending). When the SSCOP receives the AA-RELEASE-request, it transmits an END signal to the node B and changes to the state 4 (Outgoing Disconnection Pending). AAL is an abbreviation for ATM Adaptation Layer, SSCF for Service Specific Coordination Function, NNI for Network Node Interface, and SSCOP for Service Specific Connection Oriented Protocol.

If the SSCOP receives a signal (SD) (with a sequence number (SN=101)), which has been transmitted from the node B and has crossed the END transmission, after it has transmitted the END signal before it changes from the state 10 (Data Transfer Ready) to the state 4 (Outgoing Disconnection Pending), then the SSCOP notifies the SSCF-NNI of the sequence number (SN=101) of the signal with an AA-DATA-indication.

The MTP3 transmits an AAL-RETRIEVE_BSNT-request to the SSCF-NNI at any time after it has transmitted the AAL-STOP signal. In response to the AAL-RETRIEVE_B-SNT-request, the SSCF-NNI notifies the MTP3 of the sequence number (SN=101) of the last signal received before it changes to the state 4 (Outgoing Disconnection Pending) with an AAL-BSNT-confirmation.

When the SSCOP receives an ENDAK signal from the node B in response to the transmitted END signal, it transmits an AA-RELEASE-confirmation to the SSCF-NNI and changes to the state 1 (Idle). When the SSCF-NNI receives the AA-RELEASE-confirmation, it changes to the state 1/1/1 (Out Of Service/Idle) and stops the link.

Examples of relevant references include JP-A 2003-124995 (hereinafter referred to as Patent Document 1) and JP-A 2004-112419 (hereinafter referred to as Patent Document 2). For example, the aforementioned technology and terms being used are described in TTC JT-Q2110 (hereinafter referred to as Non-Patent Document 1), TTC JT-Q2140 (hereinafter referred to as Non-Patent Document 2), ITU-T Q.2110 (hereinafter referred to as Non-Patent Document 3), ITU-T Q.2140 (hereinafter referred to as Non-Patent Document 4), Annex 3.1 MTP Specification of NTT Specification: Collection of Technical Conditions (ATM interface for signals) (hereinafter referred to as Non-Patent Document 5), and Shin-ichi Kuribayashi, "Easy ATM Network Signal Scheme," Publisher: the Telecommunications Association, Seller: Ohmsha, pp.38-57 (hereinafter referred to as Non-Patent Document 6).

Patent Document 1 describes a communication control apparatus (signaling processor) having an SSCOP function part (protocol processing part) based on Recommendation Q.2110. Patent Document 1 also describes an operation of an SSCF function part based on Recommendation Q.2130. Furthermore, a release process of a connection between devices is described at paragraph [0041] of Patent Document 1.

Patent Document 2 describes an ATM communication apparatus that forms an AAL using an SSCOP and an SSCF as with Patent Document 1. Patent Document 2 describes, at paragraphs [0012] and [0013], examples of primitives between the SSCF and the Layer 3 and signals between the SSCF and the SSCOP.

DISCLOSURE OF INVENTION

Problem(s) to be Solved by the Invention

However, the following problems arise in link switching between signaling processors in the aforementioned method or Patent Documents 1 and 2.

If one of signaling processors detects a failure of a link being connected and notifies a correspondent signaling processor of a link release request (an END signal in the case of an ATM), an SD signal transmitted nearly at the same time from the correspondent signaling processor is lost according to a link switching process.

In other words, an SD signal that has been transmitted from the correspondent signaling processor before the correspondent signaling processor receives the link release request after the link release request has been transmitted is not retrieved during the process and is thus lost.

In the example of FIG. 4, if the SSCF-NNI is configured to immediately discard the signal (with the sequence number (SN=101)) that has been received from the SSCOP with the AA-DATA-indication in the state 1/4/1, then a loss of the signal (SN=101) is caused at the time when the signal is received.

Furthermore, if the SSCF-NNI is configured such that, after the SSCF-NNI notifies the MTP3 of the sequence number (SN=101) of the last received signal with the AAL-BSNT-confirmation in response to the AAL-RETRIEVE_BSNT-request from the MTP3, the SSCF-NNI discards the sequence number (SN=101) of the received signal, then the signaling processor loses the received signal (with the sequence number (SN=101)).

An object of the present invention is to provide a signaling processor that prevents a signal loss caused by link switching conducted when a failure of a link being connected is detected.

Another object of the present invention is to provide a link switching method that prevents a signal loss caused by link switching in a signaling processor that has detected a failure of a link being connected.

Means to Solve the Problem(s)

A signaling processor according to the present invention has a message transfer part for a Layer 2 operable to notify a message transfer part for a Layer 3 of a signal indicative of stop (release) completion of a link being connected when it receives a response to a request for a link release process after detection of a failure of the link being connected and notification of the request for the link release process to a correspondent signaling processor and a message transfer part for the Layer 3 operable to perform a retrieval process of a received signal that has not been retrieved and has been stored in the message transfer part for the Layer 2 when it receives the signal indicative of stop (release) completion of the link.

In a link switching method according to the present invention, a failure of a link being connected is detected in a signaling processor, and a request for a link release process is transmitted to a correspondent signaling processor. A message transfer part for a Layer 2 notifies a message transfer part for a Layer 3 of a signal indicative of stop (release) completion of the link being connected when it receives a response to the request for the link release process. The message transfer part for the Layer 3 performs a retrieval process for a received signal that has not been retrieved and has been stored in the message transfer part for the Layer 2 when it receives the signal indicative of stop (release) completion of the link and switches the link between the signaling processor and the correspondent signaling processor after the retrieval process for the received signal that has not been retrieved.

Effect(s) of the Invention

According to the present invention, there can be provided a signaling processor that prevents a signal loss caused by link switching conducted when a failure of a link being connected is detected.

Furthermore, according to the present invention, there can be provided a link switching method that prevents a signal loss caused by link switching in a signaling processor that has detected a failure of a link being connected.

BEST MODE FOR CARRYING OUT THE INVENTION

An embodiment of the present invention will be described below in detail with reference to FIGS. 1 and 2.

Figure 1:
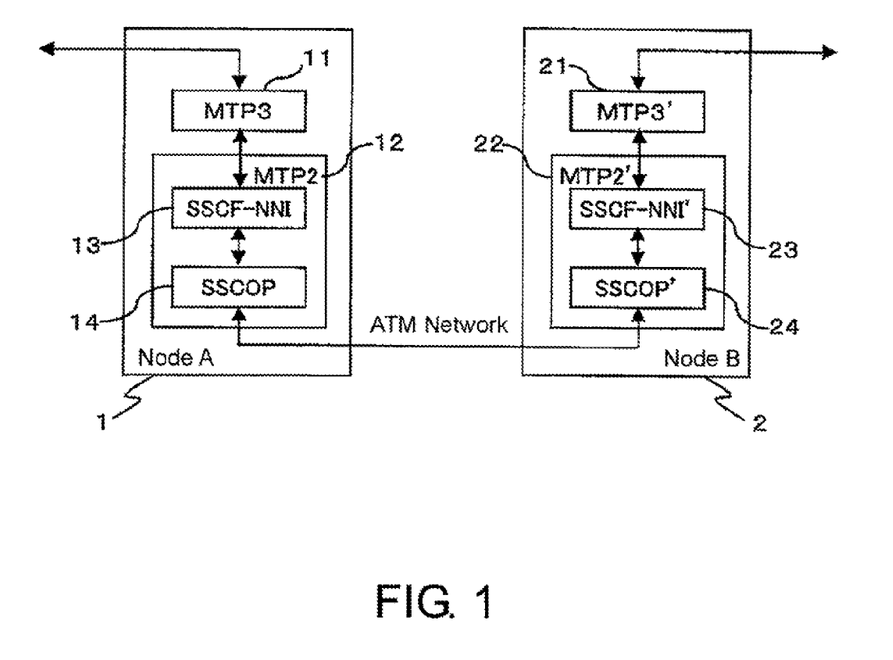
FIG. 1 is a functional block diagram showing an example of signaling processors connecting to an ATM network according to an embodiment.

FIG. 1 is a functional block diagram showing an example of signaling processors connecting to an ATM network according to an embodiment.

Referring to FIG. 1, a node A1, which is a signaling processor connecting to an ATM network, includes an MTP3 11 as a message transfer part for a Layer 3 and an MTP2 12 as a message transfer part for a Layer 2. The MTP2 12 includes an SSCF-NNI 13 and an SSCOP 14. A node B2 includes an MTP3' 21 and an MTP2' 22 as a message transfer part for the Layer 2. The MTP2' 22 includes an SSCF-NNI' 23 and an SSCOP' 24.

The node A1, which is a signaling processor, receives a transmitting signal of signaling data transmitted from other nodes connecting to the node A1, terminates the MTP Level 3 at the MTP3 11, and transmits the extracted signaling data (SD) via the SSCF-NNI 13 and the SSCOP 14 to the correspondent node B2 with which the node A1 has established link connection in the ATM network.

The node B2 receives signaling data transmitted from other nodes connecting to the node B2, terminates the MTP Level 3 at the MTP3' 21, and transmits the extracted signaling data (SD) via the SSCF-NNI' 23 and the SSCOP' 24 to the node A with which the node B2 has established link connection in the ATM network.

When the node A1 detects a link failure in the link connection between the nodes A1 and B2, it transmits an AAL-STOP signal, which is a request for stopping peer communication from the MTP3 11 to the Layer 2, to the SSCF-NNI 13. At that time, the MTP3 11 is set so as not to transmit an AAL-RETRIEVE_BSNT-request until it receives a signal indicative of stop (release) completion of the link being connected (link stop completion signal), which will be described later.

When the SSCF-NNI 13 receives the AAL-STOP signal, it transmits an AA-RELEASE-request to the SSCOP 14 and changes to the state 1/4/1 (Out Of Service/Outgoing Disconnection Pending). When the SSCOP 14 receives the AA-RELEASE-request, it transmits an END signal as a request for a link release process to the node B2 and changes to the state 4 (Outgoing Disconnection Pending). When the SSCOP 14 receives a sequence number (SN=101) of a signal (SD), which has been transmitted from the node B2 and has crossed the END transmission, before it changes to the state 4 (Outgoing Disconnection Pending), then the SSCOP 14 transmits the sequence number (SN=101) of the signal to the SSCF-NNI 13 with an AA-DATA-indication. The SSCOP 14 may transmit the sequence number of the signal to the SSCF-NNI 13 before it receives an ENDAK signal after it has changed to the state 4 (Outgoing Disconnection Pending).

When the SSCF-NNI 13 receives the sequence number (SN=101) of the signal with the AA-DATA-indication, it discards the sequence number of the received signal because it is in the state 1/4/1 (Out Of Service/Outgoing Disconnection Pending). When the SSCOP 14 receives the ENDAK signal, as a response to the transmitted request for a link release process (a response to the END signal), from the node B2, it transmits an AA-RELEASE-confirmation to the SSCF-NNI 13 and changes to the state 1 (Idle).

Whether or not the SSCF-NNI 13 discards the sequence number of the received signal in the state 1/4/1 (Out Of Service/Outgoing Disconnection Pending) is not defined by Recommendation Q.2140 for an SSCF-NNI and may be determined in any way. Furthermore, Recommendation Q.2210 for an MTP3 or Recommendation Q.2140 for an SSCF-NNI has no description about how to respond to an AAL-STOP signal from an MTP3 and when to transmit an AAL-RETRIEVE_BSNT-request from an MTP3, which may be determined in any way. In the present embodiment, the SSCF-NNI is designed to immediately discard the signal (with the sequence number (SN=101)) received from the SSCOP with the AA-DATA-indication when the SSCF-NNI is in the state 1/4/1.

When the SSCF-NNI 13 receives the AA-RELEASE-confirmation, it transmits a link stop completion signal, which is a signal indicative of stop (release) completion of the link connected to the MTP3 11, and changes to the state 1/1/1 (Out Of Service/Idle). Thus, the link stop is completed. The link stop completion signal is a signal for MTP2 to notify the MTP3 that the link stop process has been completed.

When the MTP3 11 receives the link stop completion signal, it transmits an AAL-RETRIEVE_BSNT-request to the SSCF-NNI 13 in order to obtain the sequence number of the SD signal to be retrieved. In response to the AAL-RETRIEVE_BSNT-request, the SSCF-NNI 13 notifies the MTP3 11 of the sequence number of the last received signal with an AAL-BSNT-confirmation.

The MTP3 11 obtains a difference between the sequence number of the signal received from the SSCF-NNI 13 before the link stop and the sequence number of the signal transmitted with the AAL-BSNT-confirmation to thereby identify the signal to be retrieved. The MTP3 11 transmits an AAL-RETRIEVAL_REQUEST_AND_FSNC-request to the SSCF-NNI 13 in order to retrieve the signal that has not been retrieved.

When the SSCF-NNI 13 receives the AAL-RETRIEVAL_REQUEST_AND_FSNC-request, it transmits an AA-RETRIEVE-request to the SSCOP 14. The SSCOP 14 carries the signal remaining in a receiving buffer on an AA-RETRIEVE-indication and transmits that signal to the SSCF-NNI 13. When the SSCF-NNI 13 receives the AA-RETRIEVE-indication, it transmits the retrieved signal to the MTP3 11 with an AAL-RETRIEVED_MESSAGES-indication.

The MTP3 11 repeats the process from the transmission of the AAL-RETRIEVAL_REQUEST_AND_FSNC-request to the reception of the AAL-RETRIEVED_MESSAGES-indication the same number of times as the difference previously confirmed. Thus, the MTP3 11 retrieves all of the received signals remaining in the MTP2 12. The MTP3 11 notifies the node B2 of the sequence number of the last retrieved signal with an XCO signal.

When the MTP3' 21 of the node B2 receives the XCO signal, it transmits an AAL-RETRIEVAL_REQUEST_AND_FSNC-request to the SSCF-NNI' 23 in order to retrieve a signal having a sequence number that is next to that of the signal received by the node A1. When the SSCF-NNI' 23 receives the AAL-RETRIEVAL_REQUEST_AND_FSNC-request, it transmits an AA-RETRIEVE-request to the SSCOP' 24. The SSCOP' 24 carries a signal remaining in a transmitting buffer on an AA-RETRIEVE-indication and transmits the AA-RETRIEVE-indication to the SSCF-NNI' 23. The SSCF-NNI' 23 carries a signal retrieved by the AA-RETRIEVE-indication on an AAL-RETRIEVED_MESSAGES-indication and transmits the AAL-RETRIEVED_MESSAGES-indication to the MTP3' 21. The MTP3' 21 delivers the retrieved signal to an MTP3' of a new link and then transmits subsequent new signals (SD) to the new link.

The node A1 and the node B2 are operated in the above manner, and thus the link switching is completed.

Next, an operation example of link switching between signaling processors connecting to an ATM network according to an embodiment will be described in detail with reference to a sequence diagram of FIG. 2.

Figure 2:
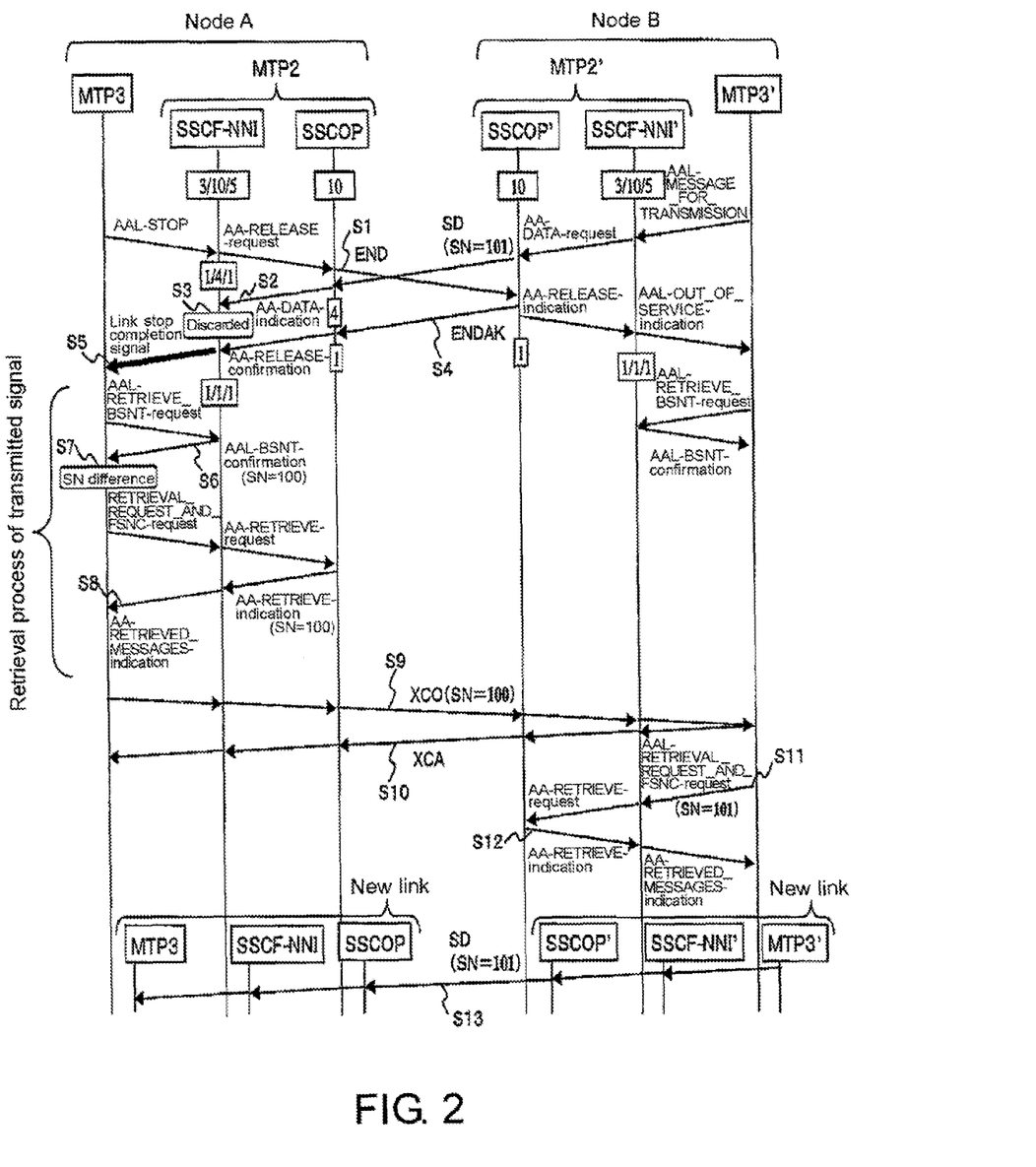
FIG. 2 is a sequence diagram showing an example of a link switching operation between signaling processors connecting to an ATM network according to a first embodiment.

FIG. 2 is a sequence diagram showing an example of a link switching operation between signaling processors connecting to an ATM network according to an embodiment. There will be described an operation in a case where a signaling signal is transmitted in a direction from the node B2 to the node A1 as signaling processors. Nevertheless, a signaling signal is transmitted in an opposite direction as well. The transmission of signaling data in the opposite direction does not directly relate to the present invention, and the explanation thereof is omitted herein.

First, when the node A1 of the signaling processor detects a link failure in a connection link between the node A1 and the node B2 of the signaling processor, it transmits an AAL-STOP signal from the MTP3 11. When the SSCF-NNI 13 receives the AAL-STOP signal, it transmits an AA-RELEASE-request and changes to the state 1/4/1 (Out Of Service/Outgoing Disconnection Pending). When the SSCOP 14 receives the AA-RELEASE-request, it transmits an END signal to the node B2 (S1) and changes to the state 4 (Outgoing Disconnection Pending).

When the SSCOP 14 receives a signal (SD) (with a sequence number (SN=101)), which has been transmitted from the node B2 and has crossed the END transmission from the node A1, before it changes to the state 4 (Outgoing Disconnection Pending), then it notifies the SSCF-NNI 13 of the sequence number (SN=101) of the signal with an AA-DATA-indication (S2).

When the SSCF-NNI 13 receives the sequence number (SN=101) of the signal with the AA-DATA-indication, it discards the sequence number (SN=101) of the received signal (S3) because it is in the state 1/4/1 (Out Of Service/Outgoing Disconnection Pending).

When the SSCOP' 24 of the node B2 receives the END signal transmitted from the SSCOP 14, it transmits an ENDAK signal to the SSCOP 14 (S4).

When the SSCOP 14 receives the ENDAK signal, it transmits an AA-RELEASE-confirmation to the SSCF-NNI 13 and changes to the state 1 (Idle). When the SSCF-NNI 13 receives the AA-RELEASE-request, it transmits a link stop completion signal to the MTP3 11 (S5) and changes to the state 1/1/1 (Out Of Service/Idle). Thus, the link is stopped.

When the MTP3 11 receives the link stop completion signal, it transmits an AAL-RETRIEVE_BSNT-request to the SSCF-NNI 13. The SSCF-NNI 13 notifies the MTP3 11 of the sequence number (SN=100) of the last received signal that has not been discarded with an AAL-BSNT-confirmation (S6).

The MTP3 11 obtains a difference between the sequence number (e.g., SN=99) of the last signal that was received from the SSCF-NNI 13 before the link stop and the sequence number (SN=100) of the signal provided by the AAL-BSNT-confirmation (S7).

Since the difference of the sequence numbers is 1, the MTP3 11 transmits an AAL-RETRIEVAL_REQUEST_AND_FSNC-request to the SSCF-NNI 13. When the SSCF-NNI 13 receives the AAL-RETRIEVAL_REQUEST_AND_FSNC-request, it transmits an AA-RETRIEVE-request to the SSCOP 14. The SSCOP 14 carries a signal (with the sequence number (SN=100)) remaining in a receiving buffer on an AA-RETRIEVE-indication and transmit the AA-RETRIEVE-indication to the SSCF-NNI 13. When the SSCF-NNI 13 then receives the AA-RETRIEVE-indication, it transmits the retrieved signal (with the sequence number (SN=100)) to the MTP3 11 with an AAL-RETRIEVED_MESSAGES-indication (S8).

If the previously confirmed difference of the sequence numbers is not less than 2, the MTP3 11 repeats the process from the transmission of the AAL-RETRIEVAL_REQUEST_AND_FSNC-request to the reception of the AAL-RETRIEVED_MESSAGES-indication the same number of times as the previously confirmed difference of the sequence numbers. Thus, the MTP3 11 retrieves all of the received signals remaining in the MTP2 12. When the MTP3 11 has retrieved all of the received signals remaining in the MTP2 12, it notifies the node B2 of the sequence number (SN=100) of the last retrieved signal with an XCO signal (S9).

When the MTP3' 21 of the node B2 receives the XCO signal, it transmits an XCA signal to the node A1 in response to the XCO signal (S10).

The MTP3' 21 that has received the XCO signal transmits an AAL-RETRIEVAL_REQUEST_AND_FSNC-request to the SSCF-NNI' 23 in order to retrieve a signal having a sequence number (SN=101) that is next to the sequence number (SN=100) of the signal that could be received by the node A1 (S11). When the SSCF-NNI' 23 receives the AAL-RETRIEVAL_REQUEST_AND_FSNC-request, it transmits an AA-RETRIEVE-request to the SSCOP' 24.

The SSCOP' 24 carries a signal (with the sequence number (SN=101)) remaining in a transmitting buffer on an AA-RETRIEVE-indication and transmits the AA-RETRIEVE-indication to the SSCF-NNI' 23 (S12). When the SSCF-NNI' 23 receives the AA-RETRIEVE-indication, it carries a signal (with the sequence number (SN=101)) that has been retrieved by the AA-RETRIEVE-indication on an AAL-RETRIEVED_MESSAGES-indication and transmits the AAL-RETRIEVED_MESSAGES-indication to the MTP3' 21.

The MTP3' 21 delivers the retrieved signal (with the sequence number (SN=101)) to an MTP3' of a new switched link and transmits signals having a sequence number greater than the sequence number (SN=101) to the new link (S13). Thus, the link switching is completed.

With the signaling processors thus operated, there can be provided a link switching method in which no signal loss is caused by link switching in a signaling processor that has detected a failure of a link being connected. In other words, there can be provided a signaling processor that can prevent a signal loss caused by link switching conducted when a failure of a link being connected is detected.

Next, signaling processors connecting to an ATM network according to a second embodiment of the present invention will be described. An operation flow of link switching between the node A1 and the node B2 of signaling processors in the second embodiment will be described with reference to FIG. 3. The configuration of the second embodiment is the same as shown in FIG. 1, and the explanation thereof is omitted herein.

Figure 3:
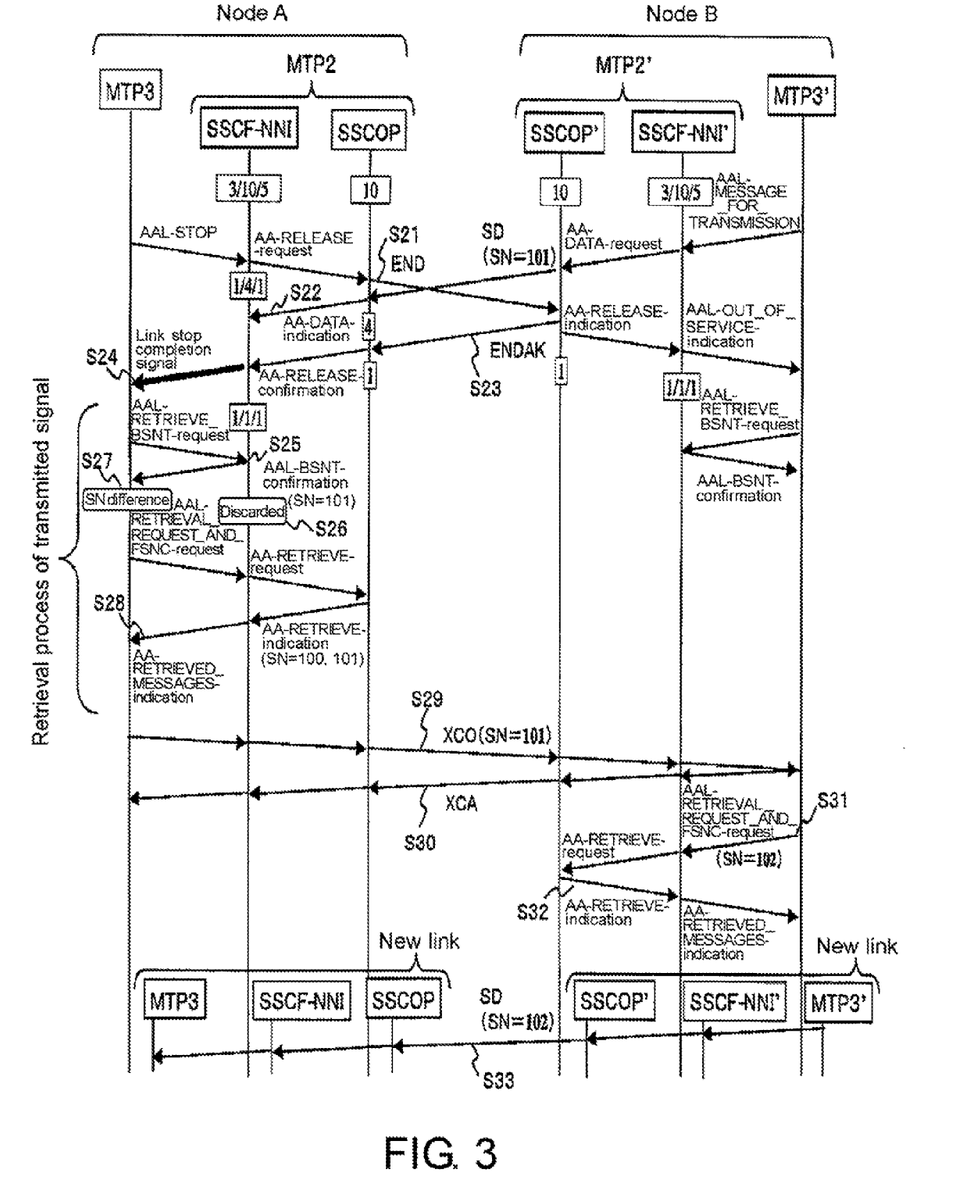
FIG. 3 is a sequence diagram showing an example of a link switching operation between signaling processors connecting to an ATM network according to a second embodiment.

The signaling processors of the second embodiment differ from those of the first embodiment in that the MTP2 holds a signal received when the SSCF-NNI is in the state 1/4/1 (Out Of Service/Outgoing Disconnection Pending) until the data are retrieved by the MTP3.

FIG. 3 is a sequence diagram showing an example of a link switching operation between signaling processors connecting to an ATM network according to the second embodiment. First, operations S21 and S22 are the same as the operations S1 and S2 of the first embodiment and explanation thereof is omitted herein. In this case, the MTP3 11 does not transmit an AAL-RETRIEVE_BSNT-request until it receives a signal indicative of stop (release) completion of the link being connected (link stop completion signal).

When the SSCF-NNI 13 receives a sequence number (SN=101) of a signal with an AA-DATA-indication, it stores and holds the sequence number (SN=101) of the received signal although it is in the state 1/4/1 (Out Of Service/Outgoing Disconnection Pending).

When the SSCOP' 24 of the node B2 receives an END signal transmitted from the SSCOP 14, it transmits an ENDAK signal to the SSCOP 14 (S23).

When the SSCOP 14 receives the ENDAK signal, it transmits an AA-RELEASE-confirmation to the SSCF-NNI 13 and changes to the state 1 (Idle). When the SSCF-NNI 13 receives the AA-RELEASE-request, it transmits a link stop completion signal to the MTP3 11 (S24) and changes to the state 1/1/1 (Out Of Service/Idle). Thus, the link is stopped.

When the MTP3 11 receives the link stop completion signal, it transmits an AAL-RETRIEVE_BSNT-request to the SSCF-NNI 13. The SSCF-NNI 13 notifies the MTP3 11 of the sequence number (SN=101) of the last received signal with an AAL-BSNT-confirmation (S25).

The SSCF-NNI 13 that has notified the MTP3 11 of the sequence number (SN=101) of the last received signal along with the AAL-BSNT-confirmation discards the stored and held sequence number (S26). At that time, an SD signal (SN=101) that has been stored and held in the receiving buffer is not discarded.

The MTP3 11 obtains a difference between the sequence number (e.g., SN=99) of the signal received from the SSCF-NNI 13 before the link stop and the sequence number (SN=101) of the signal provided by the AAL-BSNT-confirmation (S27). At that time, it is assumed that the sequence number (SN=99) has already been transmitted correctly from the MTP2 12 to the MTP3 11 and that the sequence number (SN=100) has not been received from the MTP2 12.

In this operation example, the difference of the sequence numbers is 2 (SN=101−SN=99). Therefore, the MTP3 11 transmits an AAL-RETRIEVAL_REQUEST_AND_FSNC-request to the SSCF-NNI 13. When the SSCF-NNI 13 receives the AAL-RETRIEVAL_REQUEST_AND_FSNC-request, it transmits an AA-RETRIEVE-request to the SSCOP 14. The SSCOP 14 sequentially carries signals (SN=100 and SN=101) remaining in the receiving buffer on an AA-RETRIEVE-indication and transmits the AA-RETRIEVE-indication to the SSCF-NNI 13. When the SSCF-NNI 13 receives the AA-RETRIEVE-indication, it transmits the retrieved signals (SN=100 and SN=101) to the MTP3 11 with an AAL-RETRIEVED_MESSAGES-indication (S28).

The MTP3 11 repeats the process from the AAL-RETRIEVAL_REQUEST_AND_FSNC-request to S28 the same number of times as the sequence difference to retrieve all of the received signals remaining in the MTP2 12.

The MTP3 11 that has retrieved all of the received signals remaining in the MTP2 12 notifies the node B2 of the sequence number (SN=101) of the last retrieved signal with an XCO signal (S29). When the MTP3' 21 of the node B2 received the XCO message, it transmits an XCA signal to the node A1 in response to the XCO signal (S30).

The MTP3' 21 that has received the XCO signal transmits an AAL-RETRIEVAL_REQUEST_AND_FSNC-request to the SSCF-NNI' 23 in order to retrieve a signal having a sequence number (SN=102) that is next to the sequence number (SN=101) of the signal received by the node A1 (S31). When the SSCF-NNI' 23 receives the AAL-RETRIEVAL_REQUEST_AND_FSNC-request, it transmits an AA-RETRIEVE-request to the SSCOP' 24. The SSCOP' 24 carries the signal (with the sequence number (SN=102)) remaining in the transmitting buffer on an AA-RETRIEVE-indication and transmits the AA-RETRIEVE-indication to the SSCF-NNI' 23 (S32). When the SSCF-NNI' 23 receives the AA-RETRIEVE-indication, it carries a signal (with the sequence number (SN=102)) that has been retrieved by the AA-RETRIEVE-indication on an AAL-RETRIEVED_MESSAGES-indication and transmits the AAL-RETRIEVED_MESSAGES-indication to the MTP3' 21. The MTP3' 21 delivers the retrieved signal (with the sequence number (SN=102)) to an MTP3' of a new switched link and transmits signals having a sequence number greater than the sequence number (SN=102) to the new link (S33). Thus, the link switching is completed.

The above embodiments have described the detail of a case in which a signaling processor detects a failure of a link being connected and retrieves signals received after it has notified a correspondent signaling processor of a request for a link release process before it changes to the disconnection pending state, for thereby preventing a signal loss. Signals received after the notification of the request for the link release process before the reception of a response to the request for the link release process can also be retrieved in the same manner as described above for thereby preventing a signal loss.

For example, a signaling processor may store, in a buffer, all of SD signals received after detection of a link failure and transmission of an END signal before reception of an ENDAK signal from a correspondent signaling processor. When an MTP2 receives the ENDAK signal, it may notify an MTP3 of a signal indicative of stop (release) completion of the link being connected. Then a retrieval process for all signals may be performed from the MTP3, and link switching may thus be conducted.

Furthermore, the above embodiments have described the detail of a case in which a signaling processor detects a failure of a link being connected, stores SD signals received by the MTP2 after it has notified a correspondent signaling processor of a request for a link release process, and retrieves those signals for thereby preventing a signal loss. Nevertheless, all of SD signals received after the MPT2 has transmitted a request for a link release process may be discarded. In such a case, a signal loss can be prevented in the same manner.

For example, a signaling processor temporarily stores in a buffer or does not store and discards SD signals received by an MTP2 after detection of a link failure and transmission of an END signal. When the MTP2 receives an ENDAK signal, it may notify an MTP3 of a signal indicative of stop (release) completion of the link being connected. In response to the notification of the signal indicative of stop (release) completion of the link, the MTP3 may perform a retrieval process for signals that have been stored in the MTP2 but have not been retrieved. The MTP3 may notify a node B2 of the sequence number of the last retrieved signal with an XCO signal. Then link switching may be conducted.

As described above, the embodiments of the present invention exhibit the following advantageous effects.

Since the SSCF-NNI 13 notifies the MTP3 11 of a link stop completion signal indicative of completion of link stop, the MTP3 11 can identify the timing of transmitting an AAL-RETRIEVE_BSNT-request for confirming the sequence number of a signal to be retrieved that has been received by the SSCF-NNI 13. Since the MTP3 11 transmits the AAL-RETRIEVE_BSNT-request at that timing, the sequence number of the signal to be retrieved can certainly be obtained.

Furthermore, since the number of signals to be retrieved can be obtained from the sequence number of a signal to be retrieved, the signals to be retrieved can certainly be retrieved by transmitting a request message for retrieving signals that have not been retrieved to the MTP2 the same number of times as the number of signals to be retrieved.

Moreover, an XCO signal to which an adequate sequence number has been added can be transmitted to a correspondent signaling processor.

The above embodiments have described a link switching method in a case where a link failure occurs in a connection link between signaling processors connecting to an ATM network. Nevertheless, the present invention is applicable to a link switching method in a case where a link failure occurs in a connection link between signaling processors connecting to a TDM network.

Furthermore, with regard to the ATM network being connected, the signaling processors may connect to a user-network interface (UNI) or a network node interface (NNI).

Moreover, the signaling processors may connect to the ATM network at any line speed with an interface between the signaling processors and the ATM network, such as T1, E1, STM-0, or STM-1.

In this case, each of the signaling processors may have any node configuration as long as it includes an MTP3 and an MTP2.

The present invention can be used for link switching between signaling processors connecting to an ATM network.

Specifically, the present invention is applicable to any signaling processors based upon ITU-T Q.2210 (MTP3), ITU-T Q.2140 (SSCF-NNI), and ITU-T Q.2110 (SSCOP). Similarly, the present invention is applicable to any signaling processors based upon TTC JT-Q2210 (MTP3), TTC JT-Q2140 (SSCF-NNI), and TTC JT-Q2110 (SSCOP).

This application is the National Phase of PCT/JP2010/051003, filed Jan. 20, 2010, which claims the benefit of priority from Japanese patent application No. 2009-011266, filed on Jan. 21, 2009, the disclosure of which is incorporated herein in its entirety by reference.

The invention claimed is:

1. A signaling processor for use in detecting a failure of a link being connected, comprising a message transfer part for a Layer 2; and a message transfer part for a Layer 3,
    wherein, after detection of the failure of the link and notification of a request for a link release process to a correspondent signaling processor, the message transfer part for the Layer 2 notifies the message transfer part for the Layer 3 of a signal indicative of stop (release) completion of the link being connected when it receives a response to the request for the link release process,
    wherein the message transfer part for the Layer 3 performs a retrieval process for a received signal that has not been retrieved and has been stored in the message transfer part for the Layer 2 when it receives the signal indicative of stop (release) completion of the link.

2. The signaling processor as recited in claim 1, wherein, when the message transfer part for the Layer 2 receives a transmission signal transmitted from the correspondent signaling processor after it notifies the correspondent signaling processor of the request for the link release process before it changes to a disconnection pending state, it stores the transmission signal.

3. The signaling processor as recited in claim 1, wherein the message transfer part for the Layer 3 stands by for a retrieval of a signal that has been received from the correspondent signaling processor, from the Layer 2, until it receives the signal indicative of stop (release) completion of the link after notification of the request for the link release process.

4. The signaling processor as recited in claim 1, wherein the message transfer part for the Layer 3
    stands by for a retrieval request for an SD (Sequenced Data) signal to the message transfer part for the Layer 2 until it receives the signal indicative of stop (release) completion of the link after notification of the request for the link release process, and
    retrieves the SD signal stored in the message transfer part for the Layer 2 when it receives the signal indicative of stop (release) completion of the link.

5. The signaling processor as recited in claim 1, wherein:
    the message transfer part for the Layer 2 has an SSCF (service specific coordination function) processing unit, and
    the message transfer part for the Layer 3
    requests the SSCF processing unit for stopping peer communication,
    stands by for transmission of a RETRIEVE_BSNT request to the SSCF processing unit until it receives the signal indicative of completion of link release from the SSCF processing unit after the request for stopping peer communication, and transmits the RETRIEVE_BSNT request to the SSCF processing unit and obtains a sequence number of an SD (Sequenced Data) signal to be retrieved when it receives the signal indicative of completion of the link release, and transmits a request for a retrieval of a signal that has not been retrieved to the SSCF processing unit based on the obtained sequence number of the SD signal to be retrieved, and retrieves the SD signal to be retrieved.

6. The signaling processor as recited in claim 1, wherein:

the message transfer part for the Layer 2 has an SSCF (service specific coordination function) processing unit and an SSCOP (Service Specific Connection Oriented Protocol) processing unit, and the SSCF processing unit transmits an AA-RELEASE-request to the SSCOP processing unit and changes to a state of Out Of Service/Outgoing Disconnection Pending when it receives a request for stopping peer communication that has been transmitted from the message transfer part for the Layer 3, and notifies the message transfer part for the Layer 3 of the signal indicative of completion of link release and changes to a state of Out Of Service/Idle when it receives an AA-RELEASE-confirmation from the SSCOP processing unit in the state of Out Of Service/Outgoing Disconnection Pending.

7. The signaling processor as recited in claim 1, wherein:

the message transfer part for the Layer 2 has an SSCF (service specific coordination function) processing unit and an SSCOP (Service Specific Connection Oriented Protocol) processing unit, the message transfer part for the Layer 3 requests the SSCF processing unit for stopping peer communication, stands by for transmission of a RETRIEVE_BSNT request to the SSCF processing unit until it receives the signal indicative of completion of link release from the SSCF processing unit after the request for stopping peer communication, and transmits the RETRIEVE_BSNT request to the SSCF processing unit and obtains a sequence number of an SD (Sequenced Data) signal to be retrieved when it receives the signal indicative of completion of the link release, and transmits a request for a retrieval of a signal that has not been retrieved to the SSCF processing unit based on the obtained sequence number of the SD signal to be retrieved, and retrieves the SD signal to be retrieved, and the SSCF processing unit transmits an AA-RELEASE-request to the SSCOP processing unit and changes to a state of Out Of Service/Outgoing Disconnection Pending when it receives the request for stopping peer communication that has been transmitted from the message transfer part for the Layer 3, and notifies the message transfer part for the Layer 3 of the signal indicative of completion of link release and changes to a state of Out Of Service/Idle when it receives an AA-RELEASE-confirmation from the SSCOP processing unit in the state of Out Of Service/Outgoing Disconnection Pending.

8. The signaling processor as recited in claim 7, wherein:

the message transfer part for the Layer 3 is based upon Recommendation Q.2210, the SSCF is based upon Recommendation Q.2140, and the message transfer part for the Layer 3 stands by for transmission of the RETRIEVE_BSNT request to the SSCF processing unit until it receives the signal indicative of completion of the link release from the SSCF after the request for stopping peer communication, transmits the RETRIEVE_BSNT request to the SSCF and obtains a sequence number of an SD signal to be retrieved when it receives the signal indicative of completion of the link release from the SSCF, and transmits a request for a retrieval of a signal that has not been retrieved to the SSCF based on the obtained sequence number of the SD signal to be retrieved, and retrieves the SD signal to be retrieved.

9. A link switching method comprising:

a failure detection step in which a signaling processor having a message transfer part for a Layer 2 and a message transfer part for a Layer 3 detects a failure of a link being connected between the signaling processor and a correspondent signaling processor;

a request notification step of notifying the correspondent signaling processor of a request for a link release process;

a stop notification step in which the message transfer part for the Layer 2 notifies the message transfer part for the Layer 3 of a signal indicative of stop (release) completion of the link being connected when it receives a response to the request for the link release process;

a retrieval step in which the message transfer part for the Layer 3 performs a retrieval process for a received signal that has not been retrieved and has been stored in the message transfer part for the Layer 2 when it receives the signal indicative of stop (release) completion of the link; and a switching step of switching the link between the signaling processor and the correspondent signaling processor after the retrieval process for the received signal that has not been retrieved.

10. The link switching method as recited in claim 9, wherein:

in the stop notification step, when a transmission signal transmitted from the correspondent signaling processor is received after the notification of the request for the link release process before a change to a disconnection pending state, the transmission signal is stored, and the switching step is performed after the retrieval process of the transmission signal as the retrieval process for the received signal that has not been retrieved.

11. The link switching method as recited in claim 9, wherein:

the message transfer part for the Layer 3 stands by for a retrieval of the transmission signal to the message transfer part for the Layer 2 until it receives the signal indicative of stop (release) completion of the link after the notification of the request for the link release process.

12. The link switching method as recited in claim 9, wherein:

the message transfer part for the Layer 2 has an SSCF (service specific coordination function) processing unit, and the link switching method comprises:

a step in which the message transfer part for the Layer 3 detects a failure of the link between the signaling processor and the correspondent signaling processor;

a step in which the message transfer part for the Layer 3 requests the SSCF for stopping peer communication;

a step in which the message transfer part for the Layer 3 stands by for transmission of a RETRIEVE_BSNT request to the SSCF;

a step in which the message transfer part for the Layer 3 transmits the RETRIEVE_BSNT request to the SSCF and obtains a sequence number of an SD (Sequenced Data) signal to be retrieved upon receipt of the signal indicative of completion of the link release from the SSCF; and a step in which the message transfer part for the Layer 3 transmits a request for a retrieval of a signal that has not been retrieved to the SSCF based on the obtained sequence number of the SD signal to be retrieved and retrieves the SD signal to be retrieved.

13. The link switching method as recited in claim 9, wherein:

the message transfer part for the Layer 2 has an SSCF (service specific coordination function) processing unit and an SSCOP (Service Specific Connection Oriented Protocol) processing unit, and the link switching method comprises:

a step in which the SSCF processing unit transmits an AA-RELEASE-request to the SSCOP processing unit and changes to a state of Out Of Service/Outgoing Disconnection Pending when it receives a request for stopping peer communication that has been transmitted from the message transfer part for the Layer 3; and a step in which the SSCF processing unit notifies the message transfer part for the Layer 3 of the signal indicative of completion of link release and changes to a state of Out Of Service/Idle when it receives an AA-RELEASE-confirmation from the SSCOP processing unit in the state of Out Of Service/Outgoing Disconnection Pending.

14. The link switching method as recited in claim 9, wherein:

the message transfer part for the Layer 2 has an SSCF (service specific coordination function) processing unit and an SSCOP (Service Specific Connection Oriented Protocol) processing unit, and the link switching method comprises:

a step in which the message transfer part for the Layer 3 detects a failure of the link between the signaling processor and the correspondent signaling processor;

a step in which the message transfer part for the Layer 3 requests the SSCF for stopping peer communication;

a step in which the message transfer part for the Layer 3 stands by for transmission of a RETRIEVE_BSNT request to the SSCF;

a step in which the SSCF processing unit transmits an AA-RELEASE-request to the SSCOP processing unit and changes to a state of Out Of Service/Outgoing Disconnection Pending when it receives the request for stopping peer communication that has been transmitted from the message transfer part for the Layer 3;

a step in which the SSCF processing unit notifies the message transfer part for the Layer 3 of the signal indicative of completion of link release and changes to a state of Out Of Service/Idle when it receives an AA-RELEASE-confirmation from the SSCOP processing unit in the state of Out Of Service/Outgoing Disconnection Pending;

a step in which the message transfer part for the Layer 3 transmits the RETRIEVE_BSNT request to the SSCF and obtains a sequence number of an SD (Sequenced Data) signal to be retrieved when it receives the signal indicative of completion of the link release from the SSCF; and a step in which the message transfer part for the Layer 3 transmits a request for a retrieval of a signal that has not been retrieved to the SSCF based on the obtained sequence number of the SD signal to be retrieved, and retrieves the SD signal to be retrieved.

15. The link switching method as recited in claim 14, wherein:

the message transfer part for the Layer 3 is based upon Recommendation Q.2210, the SSCF is based upon Recommendation Q.2140, and the message transfer part for the Layer 3 stands by for transmission of a RETRIEVE_BSNT request to the SSCF processing unit until it receives the signal indicative of completion of the link release from the SSCF after the request for stopping peer communication to the SSCF-NNI of the Layer 2, transmits the RETRIEVE_BSNT request to the SSCF and obtains a sequence number of an SD signal to be retrieved when it receives the signal indicative of completion of the link release from the SSCF, transmits a request for a retrieval of a signal that has not been retrieved to the SSCF based on the obtained sequence number of the SD signal to be retrieved, and retrieves the SD signal to be retrieved, and switches the link between the signaling processor and the correspondent signaling processor after the retrieval process for the SD signal.

* * * * *